US009473554B2

(12) United States Patent
Isozu et al.

(10) Patent No.: US 9,473,554 B2
(45) Date of Patent: Oct. 18, 2016

(54) INFORMATION PROCESSING APPARATUS, INFORMATION PROCESSING METHOD, AND PROGRAM FOR CONNECTING AN APPARATUS TO THE INTERNET

(71) Applicant: Sony Corporation, Tokyo (JP)

(72) Inventors: Masaaki Isozu, Tokyo (JP); Kazuhiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 408 days.

(21) Appl. No.: 13/719,471

(22) Filed: Dec. 19, 2012

(65) Prior Publication Data
US 2013/0179540 A1 Jul. 11, 2013

(30) Foreign Application Priority Data

Jan. 6, 2012 (JP) .................................. 2012-000953

(51) Int. Cl.
*G06F 15/16* (2006.01)
*H04L 29/08* (2006.01)

(52) U.S. Cl.
CPC ............. *H04L 67/02* (2013.01); *H04L 67/025* (2013.01); *H04L 67/322* (2013.01); *H04L 67/2814* (2013.01); *H04L 67/2823* (2013.01)

(58) Field of Classification Search
CPC ... H04L 67/02; H04L 67/025; H04L 67/322; H04L 67/2814; H04L 67/2823
See application file for complete search history.

(56) References Cited

U.S. PATENT DOCUMENTS

| 6,032,119 A * | 2/2000 | Brown et al. ...................... 705/2 |
| 2006/0241864 A1 * | 10/2006 | Rosenberg .................... 701/213 |
| 2007/0185646 A1 * | 8/2007 | Neugebauer et al. ........ 701/201 |
| 2008/0231449 A1 * | 9/2008 | Moshfeghi ................. 340/572.1 |
| 2011/0063106 A1 * | 3/2011 | Snodgrass ............. G06F 19/327 340/539.16 |
| 2012/0163206 A1 * | 6/2012 | Leung .................. G01S 5/0009 370/252 |
| 2012/0182119 A1 * | 7/2012 | Vetter et al. ................... 340/4.3 |

FOREIGN PATENT DOCUMENTS

JP    2005-110057 A    4/2005

* cited by examiner

Primary Examiner — Viet Vu
(74) Attorney, Agent, or Firm — Chip Law Group

(57) ABSTRACT

An information processing apparatus includes a first communication unit, a second communication unit, and a control unit. The first communication unit is configured to be capable of communicating with a first apparatus via a predetermined communication path. The first apparatus has a predetermined sensing function and does not have an Internet connecting function. The second communication unit is configured to be capable of communicating with a second apparatus via the Internet. The control unit is configured to be capable of controlling the first communication unit to receive sensed data from the first apparatus and controlling the first communication unit to transmit the received data to the second apparatus.

13 Claims, 8 Drawing Sheets

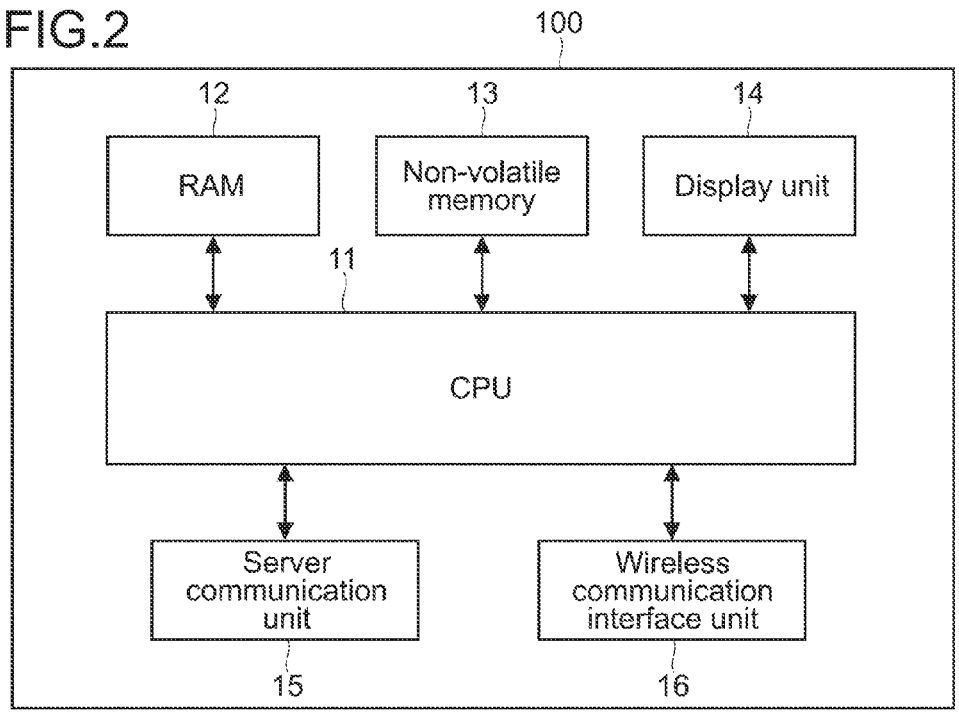
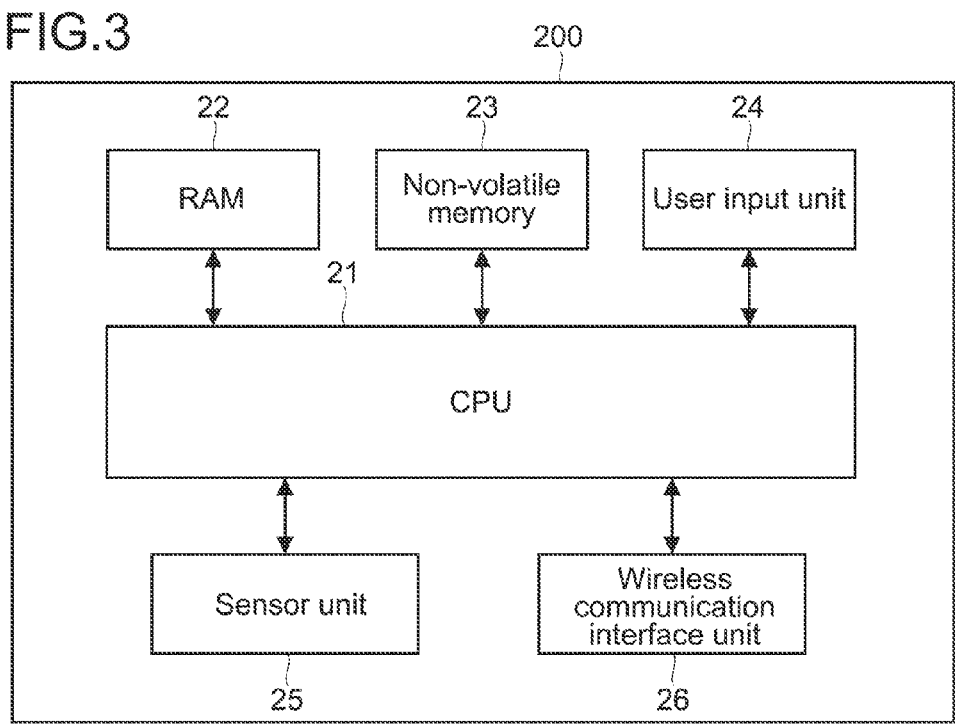

| Data type | Destination | High priority? |
|---|---|---|
| Event data | Remote node | Yes |
| Periodic acquisition data | Server | No |
| Non-regulated data | Server | Yes |
| Error data | Server | Yes |

FIG.8

INFORMATION PROCESSING APPARATUS, INFORMATION PROCESSING METHOD, AND PROGRAM FOR CONNECTING AN APPARATUS TO THE INTERNET

BACKGROUND

The present disclosure relates to an information processing apparatus that is capable of communicating with another apparatus, and an information processing method and a program in the information processing apparatus.

In recent years, various electronic apparatuses are capable of connecting to the Internet. In addition, also an object that is unrelated to a communication function in related art is provided with an address with the availability of IPv6 (Internet Protocol Version 6), and the object is now becoming to connect to the Internet, which is called as the Internet of Things (IoT).

However, it is difficult to connect to the Internet by using only a small-sized apparatus having no sufficient communication function. Therefore, it is difficult to establish an application service that is combined with a server on the Internet by using such an apparatus.

Japanese Patent Application Laid-open No. 2005-110057 discloses an apparatus that relays communication between electronic apparatuses. Japanese Patent Application Laid-open No. 2005-110057 describes a system that routes a command to be transmitted from a control apparatus to a terminal apparatus connected to a different protocol domain via a gateway.

SUMMARY

In the technology described in Japanese Patent Application Laid-open No. 2005-110057, each apparatus in the system has to know an address (IP address) of a destination. Therefore, in this system, it is difficult for an apparatus having no Internet connecting function to transmit data to the destination even via a gateway, and it may be impossible to combine the apparatus with an application service on the Internet.

In view of the circumstances as described above, there is a need for an information processing apparatus, an information processing method, and a program, which are capable of indirectly connecting an apparatus having no Internet connecting function to the Internet and combining the apparatus with an application service on the Internet.

According to an embodiment of the present disclosure, there is provided an information processing apparatus including a first communication unit, a second communication unit, and a control unit. The first communication unit is configured to be capable of communicating with a first apparatus via a predetermined communication path. The first apparatus has a predetermined sensing function and does not have an Internet connecting function. The second communication unit is configured to be capable of communicating with a second apparatus via the Internet. The control unit is configured to be capable of controlling the first communication unit to receive sensed data from the first apparatus. Further, the control unit is configured to be capable of controlling the second communication unit to transmit the received data to the second apparatus.

With this configuration, the information processing apparatus is capable of indirectly connecting the first apparatus having no Internet connecting function to the Internet and combining the first apparatus with the second apparatus that provides an application service on the Internet. In this embodiment, the predetermined communication path is a communication path in a near-field wireless communication technology such as Bluetooth (registered trademark), Zig-Bee (registered trademark), NFC (Near Field Communication), TransferJet, ANT, and ANT+.

The control unit may change a transmission timing of the received data to the second apparatus depending on a type of the received data.

Accordingly, the information processing apparatus is capable of efficiently transmitting the received data to the second apparatus depending on a network state and a state of the information processing apparatus, compared with a case where the data is transmitted to the second apparatus every time the data is received.

The information processing apparatus may further include a storage unit configured to be capable of storing priority information and the received data. The priority information indicates priority according to the type of the received data. In this case, the control unit may one of immediately transmits the received data to the second apparatus based on the stored priority information and controls the second communication unit to store a predetermined amount of the received data in the storage unit before transmitting the predetermined amount of the received data to the second apparatus.

Accordingly, the information processing apparatus is capable of immediately transmitting data having high priority to the second apparatus and the transmitted data can be used for the use of a service immediately. Moreover, the information processing apparatus is capable of reducing overhead of a header of the data and preventing traffic on the network from increasing compared with a case where the data is transmitted individually, by storing a predetermined amount of data having low priority before transmitting the predetermined amount of data to the second apparatus.

The storage unit may store, in the priority information, one of sensed data of a location of the first apparatus and sensed data of biological information on a user of the first apparatus, as data having high priority.

Accordingly, the information processing apparatus is capable of providing a real-time feedback obtained from the second apparatus to a user of the first apparatus by immediately transmitting, to the second apparatus, biological information on physical condition of the user of the first apparatus or location information of the user.

When the received data is duplicated with data that has been received previously, the control unit may delete one of the data.

Accordingly, the information processing apparatus is capable of preventing the duplicated data from being transmitted to the second apparatus to increase traffic on the network.

The control unit may control the first communication unit to transmit, to the first apparatus, a message asking for a change of a transmission frequency of data to be transmitted from the first apparatus depending on one of an electric power state of the information processing apparatus and a communication state of the network.

Accordingly, the information processing apparatus is capable of preventing the data from not being appropriately transmitted to the second apparatus by causing the first apparatus to reduce the transmission frequency of data depending on the electric power state or the communication state of the network, when the connection state to the second apparatus is deteriorated. Moreover, the information processing apparatus is capable of appropriately transmitting the data to the second apparatus by causing the first apparatus to increase the transmission frequency of data when the connection state to the second apparatus is improved.

The information processing apparatus may further include a battery and a sensor configured to execute the sensing function. The sensor is supplied with electric power from the battery. In this case, the control unit may disable the sensing function of the sensor and use, instead of data sensed by the sensor, the data received from the first apparatus for predetermined processing when a remaining amount of the battery falls below a predetermined value.

Accordingly, the information processing apparatus is capable of preventing the remaining amount of the battery from further decreasing by using the sensing function of the first apparatus instead of the sensing function in the information processing apparatus when the information processing apparatus and the first apparatus have the same sensing function.

According to another embodiment of the present disclosure, there is provided an information processing method including receiving sensed data from a first apparatus via a predetermined communication path. The first apparatus has a predetermined sensing function and does not have an Internet connecting function. The received data is transmitted to the second apparatus via the Internet.

According to still another embodiment of the present disclosure, there is provided a program that causes an information processing apparatus to execute receiving and transmitting. In the receiving, sensed data is received from a first apparatus via a predetermined communication path. The first apparatus has a predetermined sensing function and does not have an Internet connecting function. In the transmitting, the received data is transmitted to a second apparatus via the Internet.

As described above, according to the embodiments of the present disclosure, it is possible to indirectly connect an apparatus having no Internet connecting function to the Internet and combine the apparatus with an application service on the Internet.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 2 is a block diagram showing a hardware configuration of a relay apparatus in the system shown in FIG. 1;

FIG. 3 is a block diagram showing a hardware configuration of a sensor apparatus in the system shown in FIG. 1;

FIG. 8 is a diagram showing an example of a policy table managed by the relay apparatus for determining priority of data;

DETAILED DESCRIPTION OF EMBODIMENTS

Hereinafter, embodiments of the present disclosure will be described with reference to the drawings.
(Overview of System)

Figure 1:
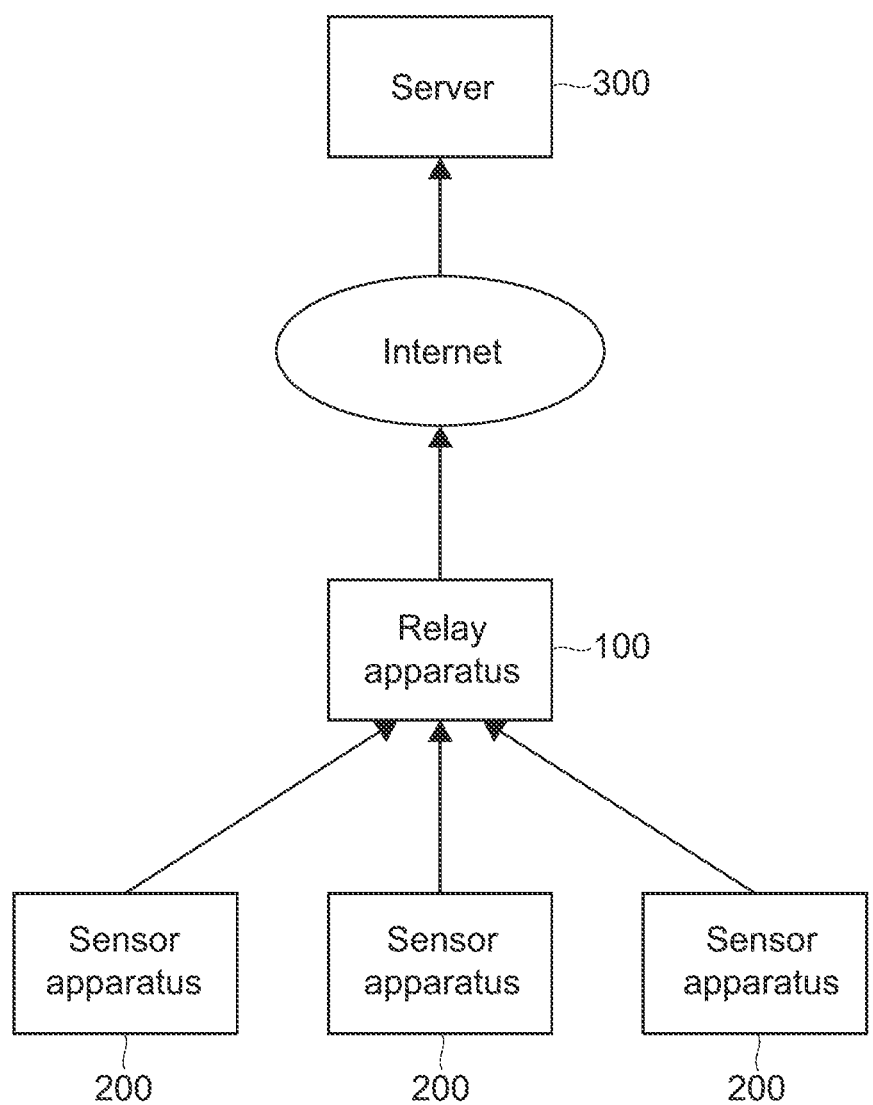
FIG. 1 is a diagram showing a network configuration of a data relay system according to an embodiment of the present disclosure.

FIG. 1 is a diagram showing a network configuration of a data relay system according to an embodiment of the present disclosure. As shown in the figure, this system includes a relay apparatus 100 that is capable of directly connecting to the Internet, a sensor apparatus 200 that mounts a sensor and is connected to the relay apparatus 100, and a server 300 on the Internet that is capable of communicating with the relay apparatus 100.

The relay apparatus 100 is a portable terminal that is capable of wirelessly connecting to the Internet all the time, for example. The portable terminal is an information processing apparatus such as a smartphone, a mobile phone, a tablet PC (Personal Computer), a PDA (Personal Digital Assistant), a portable AV player, an electronic book, and a digital still camera.

The sensor apparatus 200 is, for example, a small-sized apparatus that can be attached to a user's body and is not able to transmit data (or not able to instruct any other apparatus to transmit data) to an apparatus or a service on the Internet by itself. More specifically, the sensor apparatus 200 is, for example, a healthcare apparatus such as heart rate meters, or a GPS (Global Positioning System) terminal. The sensor apparatus 200 may have a ring shape or a belt shape so that the sensor apparatus 200 can be attached to a user's arm.

Although three sensor apparatuses 200 are shown in the figure, the number of the sensor apparatus 200 is not limited to three. Moreover, a plurality of sensor apparatus 200 are attached to or carried by one user in this embodiment.

This network configuration is significantly different from an Internet connection configuration using a gateway in related art in that the sensor apparatus 200 does not have an Internet connecting function and is not able to designate an address (IP address) of a destination on the Internet and transmit data by itself.

The relay apparatus 100 and the sensor apparatus 200 are connected by using a near-field wireless communication technology such as Bluetooth (registered trademark), Zig-Bee (registered trademark), NFC (Near Field Communication), TransferJet, ANT, and ANT+.

The relay apparatus 100 transmits, to the server 300 (service) on the Internet, the sensed data that has been received from the sensor apparatus 200.
(Hardware Configuration of Relay Apparatus)

FIG. 2 is a diagram showing a hardware configuration of the relay apparatus 100.

As shown in the figure, the relay apparatus 100 includes a CPU (Central Processing Unit) 11, a RAM (Random Access Memory) 12, a non-volatile memory 13, a display unit 14, a server communication unit 15, and a wireless communication interface unit 16.

The CPU 11 appropriately accesses the RAM 12 or the like and collectively controls each of the blocks of the relay apparatus 100 while performing various types of arithmetic processing. The RAM 12 is used as, for example, a working area of the CPU 11, and temporarily stores an OS, various applications being executed, various types of data (sensed data received from the sensor apparatus 200, or the like) being processed.

Examples of the non-volatile memory 13 include a flash memory and a ROM (Read Only Memory), and the non-volatile memory 13 fixedly stores an OS to be executed by the CPU 11, firmware such as a program (application) and various types of parameters. Moreover, the non-volatile memory 13 stores sensed information (which will be described later in detail) that has been received from the sensor apparatus 200.

Examples of the display unit 14 include an LCD (Liquid Crystal Display) and an OELD (Organic ElectroLuminescence Display), and the display unit 14 displays, for example, GUIs (Graphical User Interfaces) of various menus and applications. Moreover, the display unit 14 may be integrally formed with a touch panel.

The server communication unit 15 includes a wireless communication module that directly connects to the Internet by using a wireless LAN (e.g., IEEE802.11) such as WiFi (Wireless Fidelity) or a mobile communication network of 3G or 4G. The server communication unit 15 transmits, to the server 300 (service) on the Internet, the sensed data that has been received from the sensor apparatus 200, for example.

The wireless communication interface unit 16 is an interface that adapts to the near-field wireless communication technologies described above.

Moreover, although not shown, a battery that supplies electric power to the respective units is provided to the relay apparatus 100.

(Hardware Configuration of Sensor Apparatus)

FIG. 3 is a diagram showing a hardware configuration of the sensor apparatus 200.

As shown in the figure, the sensor apparatus 200 includes a CPU 21, a RAM 22, a non-volatile memory 23, a user input unit 24, a sensor unit 25, a wireless communication interface unit 26.

The functions of the CPU 21, the RAM 22, and the non-volatile memory 23 are the same as those of the CPU 11, the RAM 12, and the non-volatile memory 23 in the relay apparatus 100 described above, respectively. The non-volatile memory 23 stores, for example, sensed data that has been acquired by the sensor unit 25.

The user input unit 24 includes an interface such as a button and a touch panel, and receives an operation input from a user to whom the sensor apparatus 200 is attached.

The sensor unit 25 includes various sensors having a predetermined sensing function and transmits, to the CPU 21, sensed data that is acquired by the sensors. Moreover, the sensor unit 25 causes the non-volatile memory 23 to store the sensed data. The sensed data includes biological information such as heart rate and body temperature, weather information such as temperature and atmospheric pressure, physical information such as acceleration and gravity, location information, orientation information, and the like. In order to acquire the data, the sensor unit 25 includes sensors such as a heart rate meter, a clinical thermometer, a thermometer, an air gauge, an angular velocity (gyro) sensor, an acceleration sensor, a GPS sensor, and a geomagnetic sensor.

The wireless communication interface unit 26 has the same function as the wireless communication interface unit 16 in the relay apparatus 100 described above.

(Software Configuration of Relay Apparatus)

The relay apparatus 100 includes software modules, i.e., a data management module, a transmission data control module, and a data transmission module, although not shown. These modules are stored in the non-volatile memory 13.

The data management module manages, in the non-volatile memory 13 or the like, the data that has been received from the sensor apparatus 200 depending on the data type (which will be described later) or the like.

The transmission data control module determines, for example, whether the data that has been received from the sensor apparatus 200 should be stored by the data management module or should be transmitted to the server 300 immediately depending on the priority (which will be described later) or the like, and instructs the data transmission module to transmit the data.

The data transmission module transmits, by the server communication unit 15 described above, the data that has been acquired from the sensor apparatus 200 to the server 300 in response to the instruction from the transmission data control module.

(Operations of System)

Next, the operations of the relay apparatus 100 and the sensor apparatus 200 having the configuration described above will be described. Although the CPU 11 in the relay apparatus 100 and the CPU 21 in the sensor apparatus 200 are described as a main operation subject in the following description, the operations are performed in cooperation with a program to be executed under the control of the CPU 11 or the CPU 21.

Figure 4:
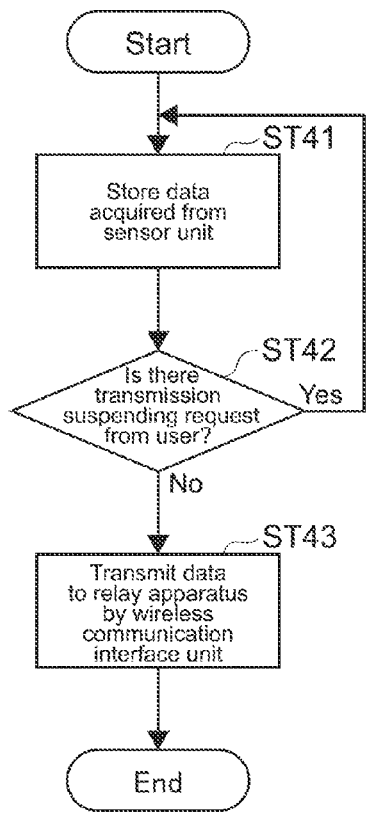
FIG. 4 is a flowchart showing a flow of a basic operation of the sensor apparatus.

FIG. 4 is a flowchart showing a flow of a basic operation of the sensor apparatus 200 according to this embodiment.

As shown in the figure, the CPU 21 in the sensor apparatus 200 periodically acquires sensed data from the sensor unit 25, and stores the sensed data in the non-volatile memory 23 (Step 41).

Next, the CPU 21 determines whether or not there is a transmission suspending request of the sensed data from a user (Step 42). The transmission suspending request is input by the user input unit 24 described above (i.e., button press). It is assumed that the user inputs the transmission suspending request when, for example, the remaining amount of a battery (not shown) in the sensor apparatus 200 becomes small and the user desires the electric power not to be consumed by data transmission.

When determining that there is the transmission suspending request of the data from the user (Yes in Step 42), the CPU 21 continues the data acquisition processing in Step 41.

When determining that there is no transmission suspending request of the data from the user (No in Step 42), the CPU 21 transmits the stored data to the relay apparatus 100 by the wireless communication interface unit 16 (Step 43).

In the figure, although an example in which the sensor apparatus 200 periodically acquires the sensed data and transmits the sensed data to the relay apparatus 100 is described, instead of or in addition to the periodic transmission, the sensed data may be transmitted immediately when an event has occurred. Examples of such an event include a case where the user swings his/her arm to which the sensor apparatus 200 is attached and the sensor unit 25 (acceleration sensor) detects the swing, and a case where the heart rate of the user to be acquired by the sensor unit 25 (heart rate meter) exceeds a predetermined threshold value. The event may include various cases in addition to these cases.

Figure 5:
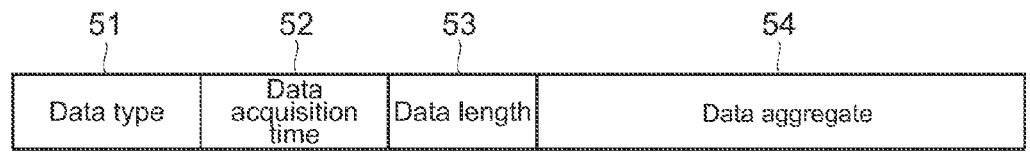
FIG. 5 is a diagram showing a format of data to be transmitted from the sensor apparatus to the relay apparatus.

FIG. 5 is a diagram showing a format of sensed data to be transmitted from the sensor apparatus 200 to the relay apparatus 100.

As shown in the figure, the sensed data includes data items, i.e., a data type 51, a data acquisition time 52, a data length 53, and a data aggregate 54.

The data type 51 stores, for example, information that indicates a data type such as "event data" and "periodic acquisition data." The data acquisition time 52 stores information that indicates the time when the sensor unit 25 has acquired the sensed data. The data aggregate 54 typically includes a plurality of pieces of sensed data. The plurality of pieces of sensed data may be acquired from the same sensor or acquired from different sensors. The data length 53 stores information that indicates the length of the data aggregate 54.

Figure 6:
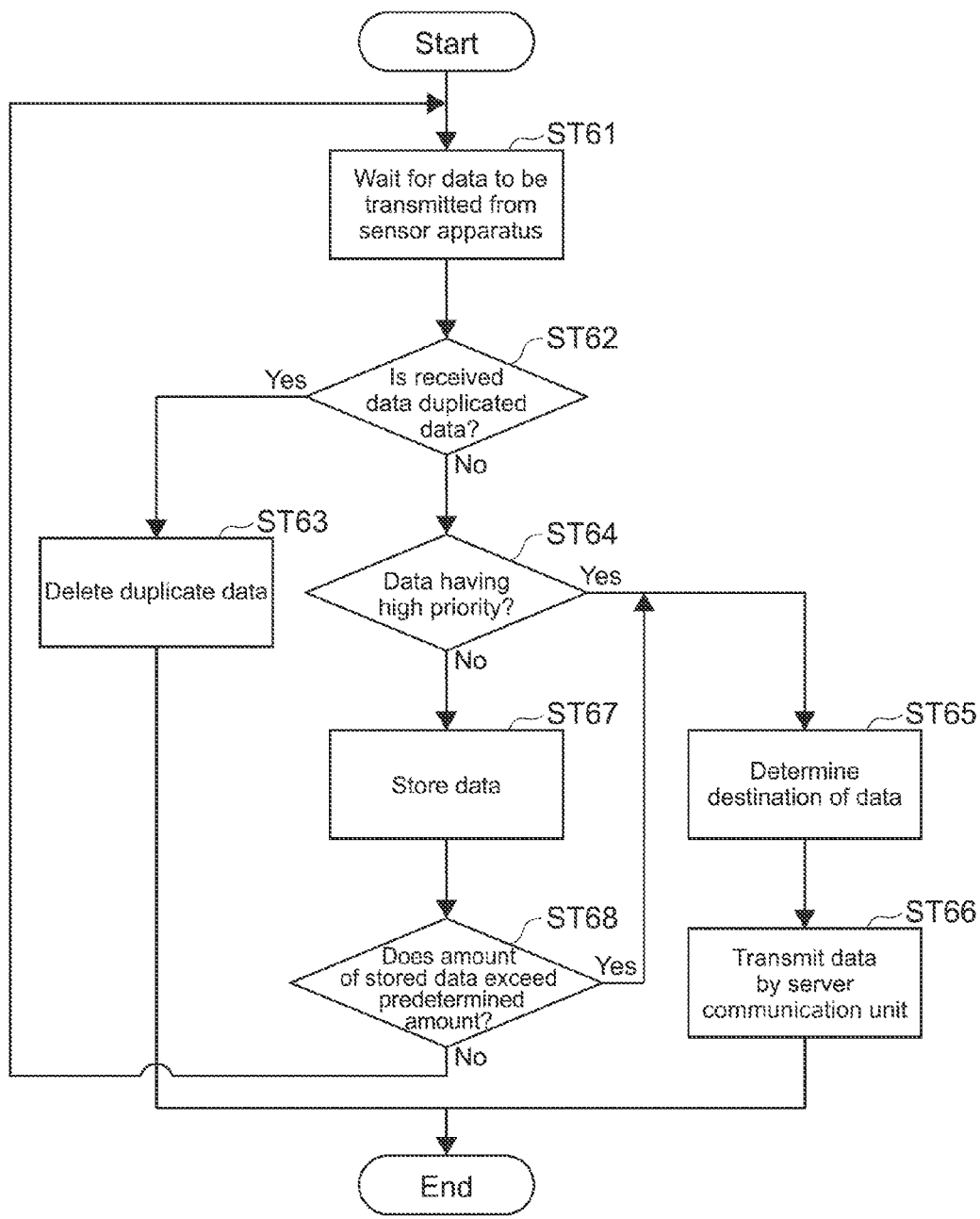
FIG. 6 is a flowchart showing a flow of a basic operation of the relay apparatus.

FIG. 6 is a flowchart showing a flow of a basic operation of the relay apparatus 100 according to this embodiment.

As shown in the figure, the CPU 11 in the relay apparatus 100 waits for data to be transmitted from the sensor apparatus 200 (Step 61), first.

When receiving data from the sensor apparatus 200, the CPU 11 determines whether or not the received data is duplicated data, i.e., whether or not the received data is one that has been received from another sensor apparatus 200 previously (Step 62).

Figure 7:
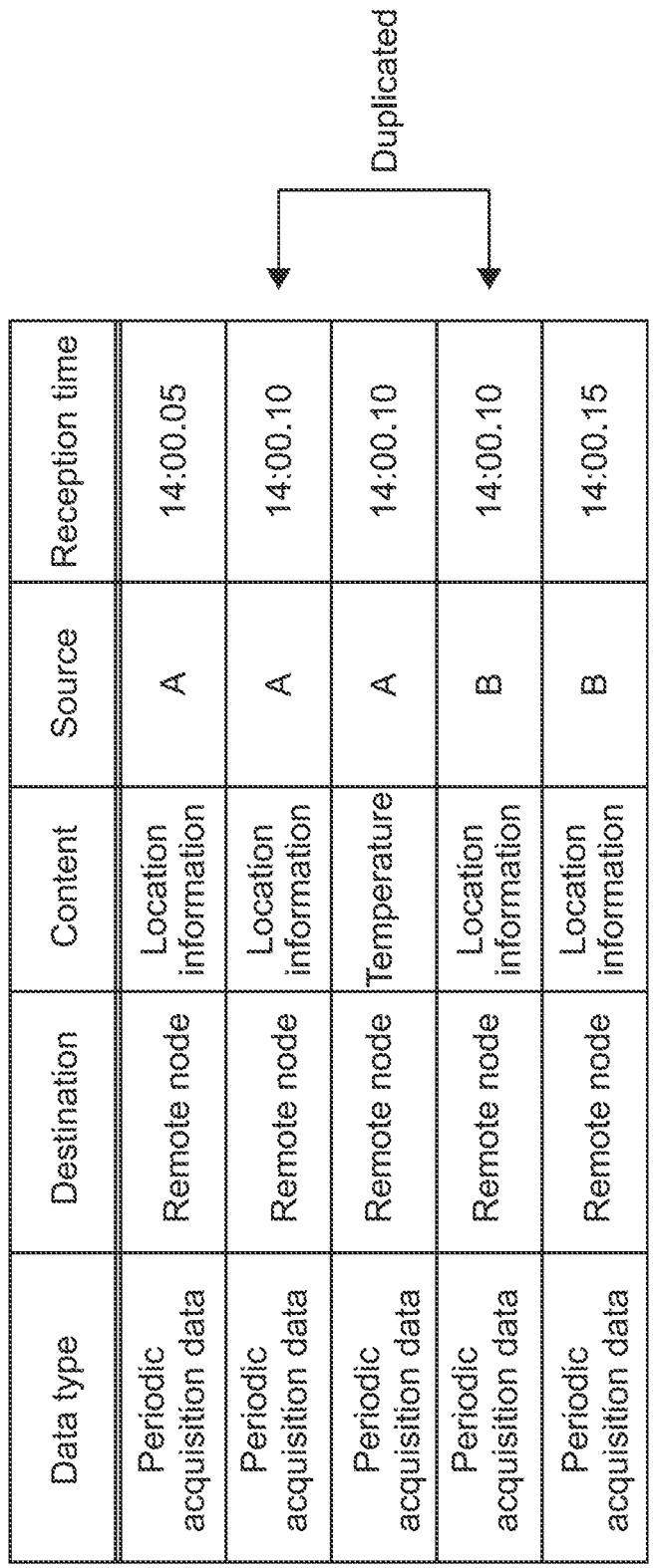
FIG. 7 is a diagram showing an example of a table for managing data that has been received from the sensor apparatus by the relay apparatus.

Here, whether or not the received data is duplicated data is determined based on a reception data management table in which the relay apparatus 100 manages the received data. FIG. 7 is a diagram showing an example of the reception data management table.

The reception data management table is created and updated by the data management module every time the CPU 11 receives data from the sensor apparatus 200, and is stored in, for example, the non-volatile memory 13. As shown in the figure, the reception data management table manages the data type, an address of an apparatus being a destination of the data, a content of the data, an address of an apparatus being a source of the data, and a reception time of the data.

In the figure, although the data on the second line from the top is different from that on the fourth line from the top in the sensor apparatus being a source, these two pieces of data have been received at the same time and have the same content. One of the two pieces of data is determined as duplicated data. In this embodiment, although data having the same data content and the same reception time is defined as duplicated data, various definitions can be applied. For example, data that has different reception time but the same data content and that has been transmitted from the same source may be defined as the duplicated data.

Figure 9:
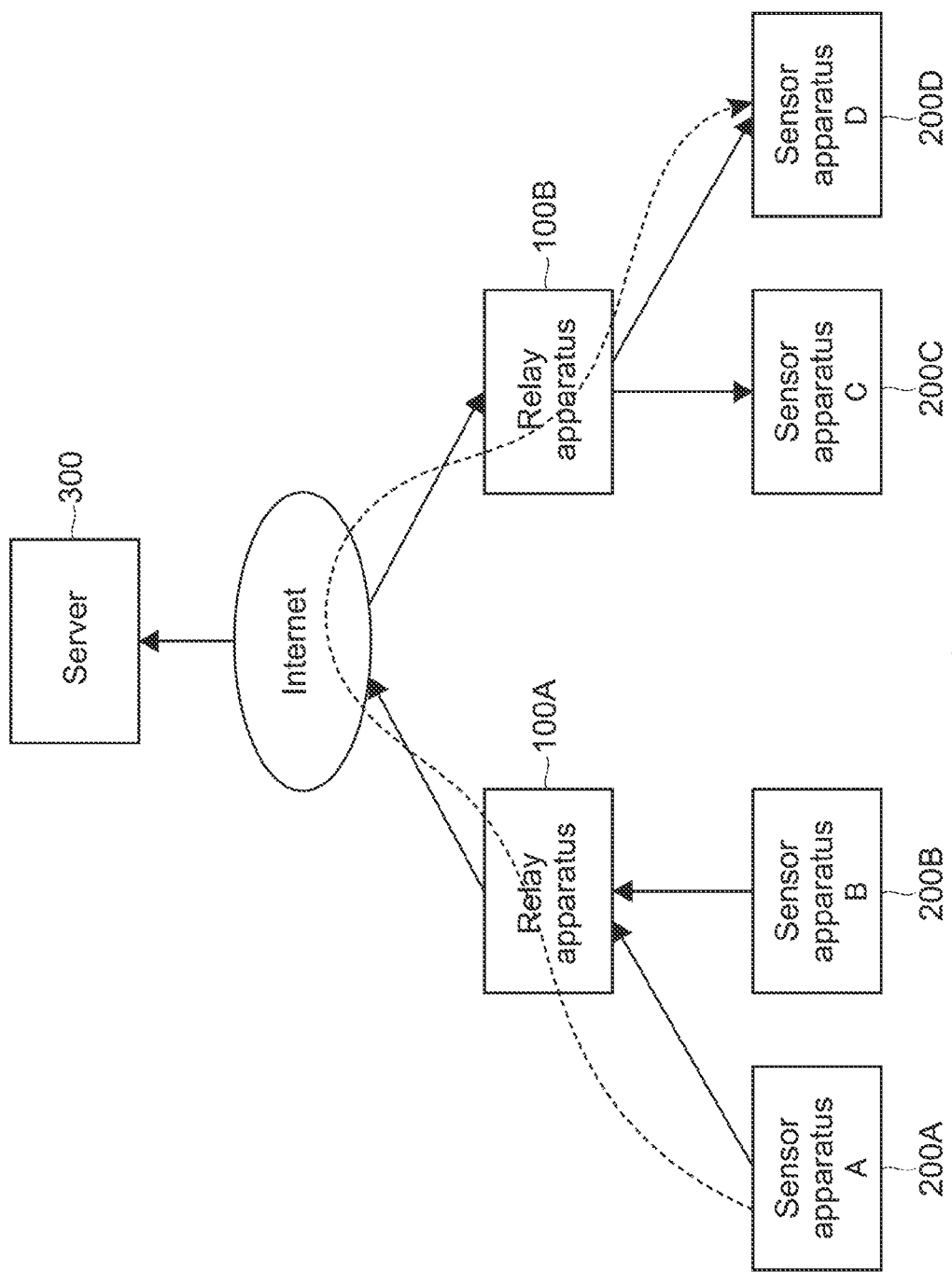
FIG. 9 is a diagram showing another network configuration of the data relay system according to the embodiment of the present disclosure.

Now, a remote node described as a destination in the figure will be described. FIG. 9 is a diagram showing another network configuration of the data relay system according to this embodiment.

In FIG. 1, an example in which the data acquired by the sensor apparatus 200 is transmitted to the server 300 on the Internet via the relay apparatus 100 has been described. However, as shown in FIG. 9, data is transmitted, in peer-to-peer fashion, from a sensor apparatus (e.g., sensor apparatus 200A or 200B) via a relay apparatus 100A that is connected to the sensor apparatus and via the server 300 on the Internet to a remote relay apparatus 100B in some cases. The data that has been transmitted to the relay apparatus 100B can be further transmitted to a different sensor apparatus (e.g., sensor apparatus 200C or 200D) that is connected to the relay apparatus 100B. In this embodiment, the relay apparatus 100B or the different sensor apparatus 200C or 200D that is located in a remote place is referred to as a remote node.

Data is transmitted from the relay apparatus 100A to the remote relay apparatus 100B as described above when, for example, a user to whom the sensor apparatus 200 is attached transmits the data to another user to whom another sensor apparatus 200 is attached. More specifically, the data is transmitted when, for example, a user notifies another user of his/her location information or biological information by transmitting the information. In this case, some messages may be attached to the data.

Moreover, the relay apparatus 100A and the relay apparatus 100B may directly communicate with each other without the server 300 in the example shown in the figure.

Now return to FIG. 6. When determining that the received data is duplicated data (Yes in Step 62), the CPU 11 deletes the received duplicated data (Step 63).

On the other hand, when determining that the received data is not duplicated data (No in Step 62), the CPU 11 determines whether or not the data has high priority based on a policy table (Step 64). FIG. 8 is a diagram showing an example of the policy table. The policy table is created by the transmission data control module in advance, and is stored in, for example, the non-volatile memory 13.

As shown in the figure, the policy table manages the data type, an apparatus being a destination, and whether or not the data has high priority. For example, priority of event data, non-regulated data, error data, and the like, which are acquired irregularly, is set higher than that of the periodic acquisition data, in relation to the data type. Moreover, priority of the remote node (relay apparatus or sensor apparatus of another user) is set higher than that of the server 300, in relation to the destination.

This is because the server 300 or another user needs to be informed of irregular data immediately, and data to be transmitted to the remote node often has some kind of message compared with that to be stored in the server 300 and needs to be transmitted immediately.

Moreover, since the location information of the user to be acquired by a GPS sensor or the like or the biological information of the user to be acquired by the heart rate meter, the clinical thermometer, or the like is data that significantly affects user convenience or physical condition of the user, priority thereof is set higher than that of other sensed data (e.g., weather information).

When determining that the received data has high priority (Yes in Step 64), the CPU 11 determines the destination of the received data by the transmission data control module with reference to also the policy table (Step 65). Then, the CPU 11 transmits the data to the determined destination (server 300 or remote node) by the server communication unit 15 (Step 66).

When determining that the received data has low priority (No in Step 64), the CPU 11 stores the data in the non-volatile memory 13 by the data management module (Step 67).

The CPU 11 determines whether or not the amount of the stored data exceeds a predetermined amount (Step 68). When determining that the amount of the stored data exceeds the predetermined amount (Yes in Step 68), the CPU 11 transmits the data by processing in Steps 65 and 66.

As described above, even the small-sized sensor apparatus 200 that is not able to connect to the Internet can transmit data to the server 300 side and can be combined with a service that is provided by the server 300 as if the sensor apparatus 200 was connected to the Internet, by the relay apparatus 100 mediating the connection between the sensor apparatus 200 and the Internet, in this embodiment. Moreover, since whether the relay apparatus 100 stores the data before the data is transmitted or the data is transmitted immediately is determined depending on the type of the sensed data, accurate transmission control based on the wireless communication state between the relay apparatus 100 and the server 300, the remaining amount of the battery in the relay apparatus 100, and the like is achieved. In particular, since a predetermined amount of data having low priority is stored before being transmitted, overhead of a header of the transmission data is reduced and traffic on the network is prevented from increasing. Further, the user can use the sensor apparatus 200 without any special setting and transmit, to the server 300 side, the sensed data that has been received from the sensor apparatus 200.

(Alternative)

The embodiments of the present disclosure are not limited to the above-mentioned embodiments and various modifications can be made without departing from the gist of the present technology.

In the above-mentioned embodiments, although the relay apparatus 100 does not have any sensor, the relay apparatus 100 may have some kind of sensor, of course. In this case, the relay apparatus 100 and the sensor apparatus 200 may complement the sensing function based on their states (remaining amount of battery, wireless communication quality, or the like). Specifically, the relay apparatus 100 and the sensor apparatus 200 are carried by (or attached to) the user, and when one of the sensing functions of them is not able to be used, the user may use the other sensing function. Accordingly, redundancy for data transmission to the server 300 may be maintained.

Figure 10:
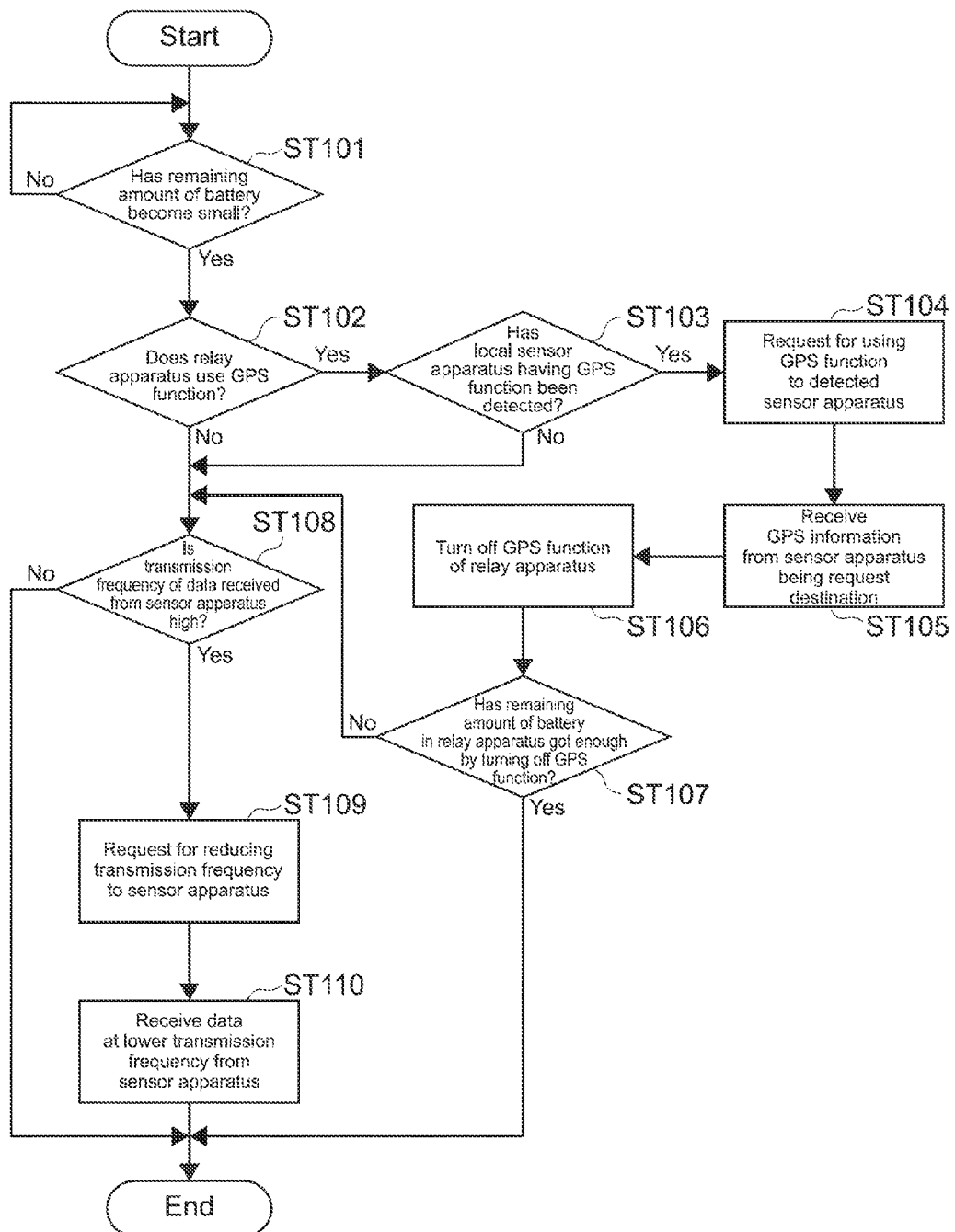
FIG. 10 is a flowchart showing a flow of an operation of a relay apparatus for reducing the consumption of a battery by working with a sensor apparatus in an alternative of the present disclosure.

As an example, a case where a location sensor (GPS sensor) is mounted in the relay apparatus 100 and the sensor apparatus 200 as a GPS sensor is attached to the user will be described. FIG. 10 is a flowchart showing a flow of an operation of the relay apparatus 100 for reducing the consumption of a battery by working with the sensor apparatus 200. Location information that has been acquired by the GPS sensor in the relay apparatus 100 may be transmitted to the server 300 or may be used for some kind of processing.

As shown in the figure, the CPU 11 in the relay apparatus 100 determines whether or not the remaining amount of the battery becomes small (falls below a predetermined amount) (Step 101).

When determining that the remaining amount of the battery has become small (Yes in Step 101), the CPU 11 determines whether or not the relay apparatus 100 uses the GPS function as a location sensor (Step 102).

When determining that the relay apparatus 100 uses the GPS function (Yes in Step 102), the CPU 11 determines whether or not the local sensor apparatus 200 having the similar GPS function has been detected (Step 103).

When determining that the local sensor apparatus 200 has been detected (Yes in Step 103), the CPU 11 transmits a message for requesting to use the GPS function to the detected sensor apparatus 200 (Step 104).

Next, the CPU 11 receives GPS information from the sensor apparatus 200 being a request destination (Step 105), and turns off its own GPS function (Step 106).

Next, the CPU 11 determines whether or not the remaining amount of the battery has got enough by turning off the GPS function (Step 107).

When determining that the remaining amount of the battery has got enough (Yes in Step 107), the CPU 11 terminates the processing.

On the other hand, when determining that the remaining amount of the battery has not got enough (No in Step 107) even after turning off the GPS function, the CPU 11 determines whether or not the transmission frequency of sensed data from the sensor apparatus 200 to the relay apparatus 100 is high (equal to or higher than a predetermined frequency) (Step 108).

When determining that the transmission frequency is high (Yes in Step 108), the CPU 11 transmits, to the sensor apparatus 200, a message for requesting to reduce the transmission frequency of sensed data (Step 109).

Then, the CPU 11 receives sensed data at lower transmission frequency from the sensor apparatus 200 (Step 110).

When determining that the relay apparatus 100 does not use the GPS function in Step 102, or when the local sensor apparatus 200 having a GPS function has not been detected in Step 103, the above-mentioned processing related to reducing the transmission frequency in Steps 108 to 110 is executed.

As described above, the relay apparatus 100 can prevent the remaining amount of the battery from decreasing by using the GPS function of the sensor apparatus 200 or requesting to reduce the transmission frequency of sensed data to the sensor apparatus 200.

In the example in FIG. 10, although the relay apparatus 100 requests for reducing the transmission frequency to the sensor apparatus 200 when using the GPS function only after the remaining amount of the battery has not got enough even if the GPS function is turned off, the processing related to the GPS function and the processing related to the transmission frequency may be executed independently.

Moreover, the relay apparatus 100 may, irrespective of the remaining amount of the battery, request for reducing the transmission frequency of data to the sensor apparatus 200 similarly to Steps 108 to 110 when the wireless communication state between the relay apparatus 100 and the server 300 has been deteriorated. Moreover, the relay apparatus 100 may, irrespective of the priority of the data, temporarily store all the data received from the sensor apparatus 200 in the non-volatile memory 13 when the wireless communication state between the relay apparatus 100 and the server 300 has been deteriorated, and collectively transmit the data to the server 300 when the communication state has been improved.

In the embodiments, the relay apparatus 100 determines whether the data is transmitted immediately or the data is stored before being transmitted based on a binary determination of whether the priority is high or low. However, three or more levels of priority may be set, and a stored amount of data may be determined depending on the level. Moreover, whether data is transmitted immediately or data is stored before being transmitted may be determined based on not the priority but simply the data type.

The example shown as a sensor included in the sensor apparatus 200 in the embodiments is only an example, and any other sensor can be applied to the present disclosure.

In the embodiments, although the relay apparatus 100 has been described as a portable terminal, the relay apparatus 100 may be a stationary information processing apparatus such as a desktop PC, a television receiver, a PVR (Personal Video Recorder), a game apparatus, and a car navigation system. Moreover, in this case the relay apparatus 100 and the server 300 may be connected not wirelessly but by using a wired connection via Ethernet (registered trademark) or the like.

(Other)

The present disclosure may also take the following configurations.

(1) An information processing apparatus, including:
a first communication unit configured to be capable of communicating with a first apparatus via a predetermined communication path, the first apparatus having a predetermined sensing function and not having an Internet connecting function;
a second communication unit configured to be capable of communicating with a second apparatus via the Internet; and
a control unit configured to be capable of controlling the first communication unit to receive sensed data from the first apparatus and controlling the first communication unit to transmit the received data to the second apparatus.

(2) The information processing apparatus according to (1), in which
the control unit changes a transmission timing of the received data to the second apparatus depending on a type of the received data.

(3) The information processing apparatus according to (2), further including
a storage unit configured to be capable of storing priority information and the received data, the priority information indicating priority according to the type of the received data, in which
the control unit one of immediately transmits the received data to the second apparatus based on the stored priority information and controls the second communication unit to store a predetermined amount of the received data in the storage unit before transmitting the predetermined amount of the received data to the second apparatus.

(4) The information processing apparatus according to (3), in which
the storage unit stores, in the priority information, one of sensed data of a location of the first apparatus and sensed data of biological information on a user of the first apparatus, as data having high priority.

(5) The information processing apparatus according to any one of (1) to (4), in which
when the received data is duplicated with data that has been received previously, the control unit deletes one of the data.

(6) The information processing apparatus according to any one of (1) to (4), in which
the control unit controls the first communication unit to transmit, to the first apparatus, a message asking for a change of a transmission frequency of data to be transmitted from the first apparatus depending on one of an electric power state of the information processing apparatus and a communication state of a network.

(7) The information processing apparatus according to any one of (1) to (4), further including:
a battery; and
a sensor configured to execute the sensing function, the sensor being supplied with electric power from the battery, in which
the control unit disables the sensing function of the sensor and uses, instead of data sensed by the sensor, the data received from the first apparatus for predetermined processing when a remaining amount of the battery falls below a predetermined value.

The present disclosure contains subject matter related to that disclosed in Japanese Priority Patent Application JP 2012-000953 filed in the Japan Patent Office on Jan. 6, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a first communication unit configured to communicate with a first apparatus via a predetermined communication path, the first apparatus having a predetermined sensing function and not having an Internet connecting function;
a second communication unit configured to communicate with a second apparatus via the Internet;
a control unit configured to control the first communication unit to receive sensed data from the first apparatus and control the second communication unit to transmit the received sensed data to the second apparatus; and
a storage unit,
wherein, upon reception of sensed data by the control unit, the control unit updates a reception data management table stored in the storage unit with information corresponding to the received sensed data, and
wherein the control unit is configured to determine whether the received sensed data is duplicate data based on reception time and content of the received sensed data, wherein the reception time and the content of the received sensed data are included as entries in the reception data management table.

2. The information processing apparatus according to claim 1, wherein the control unit changes a transmission timing of the received sensed data to the second apparatus depending on a type of the received sensed data.

3. The information processing apparatus according to claim 1,
wherein the storage unit stores priority information and the received sensed data, the priority information indicating priority according to the type of the received sensed data, and
wherein the control unit transmits the received sensed data to the second apparatus based on the stored priority information and controls the second communication unit to store a predetermined amount of the received sensed data in the storage unit before transmitting the predetermined amount of the received sensed data to the second apparatus.

4. The information processing apparatus according to claim 3, wherein the storage unit stores, in the priority information, one of sensed data of a location of the first apparatus and sensed data of biological information of a user of the first apparatus, as data having high priority.

5. The information processing apparatus according to claim 1, wherein when the received sensed data is duplicated with data that has been received previously, the control unit deletes one of the data.

6. The information processing apparatus according to claim 1, wherein the control unit controls the first communication unit to transmit, to the first apparatus, a message asking for a change of a transmission frequency of data to be transmitted from the first apparatus depending on one of an electric power state of the information processing apparatus and a communication state of a network.

7. The information processing apparatus according to claim 1, further comprising:
a battery; and
a sensor configured to execute the sensing function, the sensor being supplied with electric power from the battery,
wherein the control unit disables the sensing function of the sensor and uses, instead of data sensed by the sensor, the data received from the first apparatus for predetermined processing when a remaining amount of the battery falls below a predetermined value.

8. An information processing method, comprising:

in an information processing apparatus:

receiving sensed data from a first apparatus via a predetermined communication path, the first apparatus having a predetermined sensing function and not having an Internet connecting function;

transmitting the received sensed data to a second apparatus via the Internet;

upon reception of the sensed data, updating a reception data management table with information corresponding to the received sensed data; and upon reception of the sensed data, determining whether the received sensed data is duplicate data based on reception time and content of the received sensed data, wherein the reception time and the content of the received sensed data are included as entries in the reception data management table.

9. A non-transitory computer-readable medium having stored thereon, a set of computer-executable instructions for causing an information processing apparatus to perform steps comprising:

receiving sensed data from a first apparatus via a predetermined communication path, the first apparatus having a predetermined sensing function and not having an Internet connecting function;

transmitting the received sensed data to a second apparatus via the Internet;

upon reception of the sensed data, updating a reception data management table with information corresponding to the received sensed data; and upon reception of the sensed data, determining whether the received sensed data is duplicate data based on reception time and content of the received sensed data, wherein the reception time and the content of the received sensed data are included as entries in the reception data management table.

10. The information processing apparatus according to claim 1, wherein the received sensed data comprises a data type, a data acquisition time and a data length, and wherein the data acquisition time comprises information indicating a time at which the sensed data is acquired and the data length comprises information indicating length of the sensed data.

11. The information processing apparatus according to claim 1, wherein the information corresponding to the received sensed data comprises a data type, the reception time of the sensed data and an address of source of the sensed data.

12. The information processing apparatus according to claim 1, wherein the control unit generates the reception data management table and updates the reception data management table every time the first communication unit receives the sensed data.

13. The information processing apparatus according to claim 1, wherein, in an event reception time of the received sensed data is different, the control unit determines whether the received sensed data is duplicate data based on content of the received sensed data and source of the received sensed data.

* * * * *